United States Patent
Seyuin et al.

(10) Patent No.: US 6,508,481 B2
(45) Date of Patent: Jan. 21, 2003

(54) OUTER TIE ROD ASSEMBLY CONNECTOR BODY

(75) Inventors: Tracy A Seyuin, Grand Blanc, MI (US); Lynn Charles Krom, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 26 days.

(21) Appl. No.: 09/769,219

(22) Filed: Jan. 24, 2001

(65) Prior Publication Data

US 2002/0096851 A1 Jul. 25, 2002

(51) Int. Cl.[7] .................................................. B62D 7/20
(52) U.S. Cl. .............................. 280/93.511; 280/93.51
(58) Field of Search ......................... 280/93.51, 93.511, 280/93.512, 93.508, 93.503; 403/122

(56) References Cited

U.S. PATENT DOCUMENTS

| | | | | | |
|---|---|---|---|---|---|
| 2,208,325 | A | * | 7/1940 | Krutsch | 280/93.511 |
| 2,456,793 | A | * | 12/1948 | Reed et al. | 280/93.511 |
| 2,474,959 | A | * | 7/1949 | Rieves | 280/93.511 |
| 2,483,621 | A | * | 10/1949 | Burnett | 403/42 |
| 2,510,406 | A | * | 6/1950 | Lucas | 280/93.511 |
| 2,523,321 | A | * | 9/1950 | Nelson | 280/93.511 |
| 4,613,250 | A | * | 9/1986 | Laucus | 280/93.51 |
| 4,618,159 | A | * | 10/1986 | Kozyra et al. | 280/93.512 |
| 6,086,074 | A | * | 7/2000 | Braun | 280/89.11 |

* cited by examiner

Primary Examiner—Paul N. Dickson
Assistant Examiner—David R. Dunn
(74) Attorney, Agent, or Firm—Edmund P. Anderson

(57) ABSTRACT

An outer tie rod assembly connector body includes a first end and a second end, the first end comprising at least one hole for mounting to a steering knuckle and the second end comprising an aperture for receiving and containing a socket plug of an outer tie rod assembly.

14 Claims, 3 Drawing Sheets

OUTER TIE ROD ASSEMBLY CONNECTOR BODY

TECHNICAL FIELD

The present disclosure generally relates to a steering linkage arrangement for a motor vehicle. More specifically, but without restriction to the particular embodiment and/or use which is shown and described for purposes of illustration, the present disclosure pertains to an outer tie rod assembly connector body for a steering linkage arrangement of a motor vehicle and a related method of attaching the steering knuckle to an outer tie rod assembly.

BACKGROUND

The steering linkages associated with the wheels of modern motor vehicles include tie rod assemblies which connect right hand and left hand, front and rear steering knuckles so that any given input through a drag link is transferred to the wheels without loss of motion. A tie rod assembly typically includes an inner tie rod member and a pair of outer tie rod members. Adjustment of the tie rod assembly controls a toe setting of the vehicle, which refers to a condition in which the front portions of the front wheels are closer together than the rear portions (toe-in) or the rear portions of the wheels are closer together than the front portions (toe-out). Accurate toe setting is important to ensure proper handling and normal tire wear.

In one known arrangement typically employed when interconnecting a steering knuckle with an outer tie rod member includes utilization of an outer tie rod having a frustoconical or tapered ball stud extending through a complementary tapered aperture in an arm of the steering knuckle and having threads disposed on an end of the stud for engaging a threaded nut that causes the tapered ball stud to compressibly engage the tapered aperture when the nut is tightened.

SUMMARY

A tie rod assembly connector body body includes a first end and a second end, the first end comprising at least one hole for mounting to a steering knuckle and the second end comprising an aperture for receiving and containing a socket plug protrusion of an outer tie rod assembly.

BRIEF DESCRIPTION OF THE DRAWINGS

Referring to the exemplary drawings wherein like elements are numbered alike in the several Figures.

DESCRIPTION OF EXEMPLARY EMBODIMENTS

Figure 1:
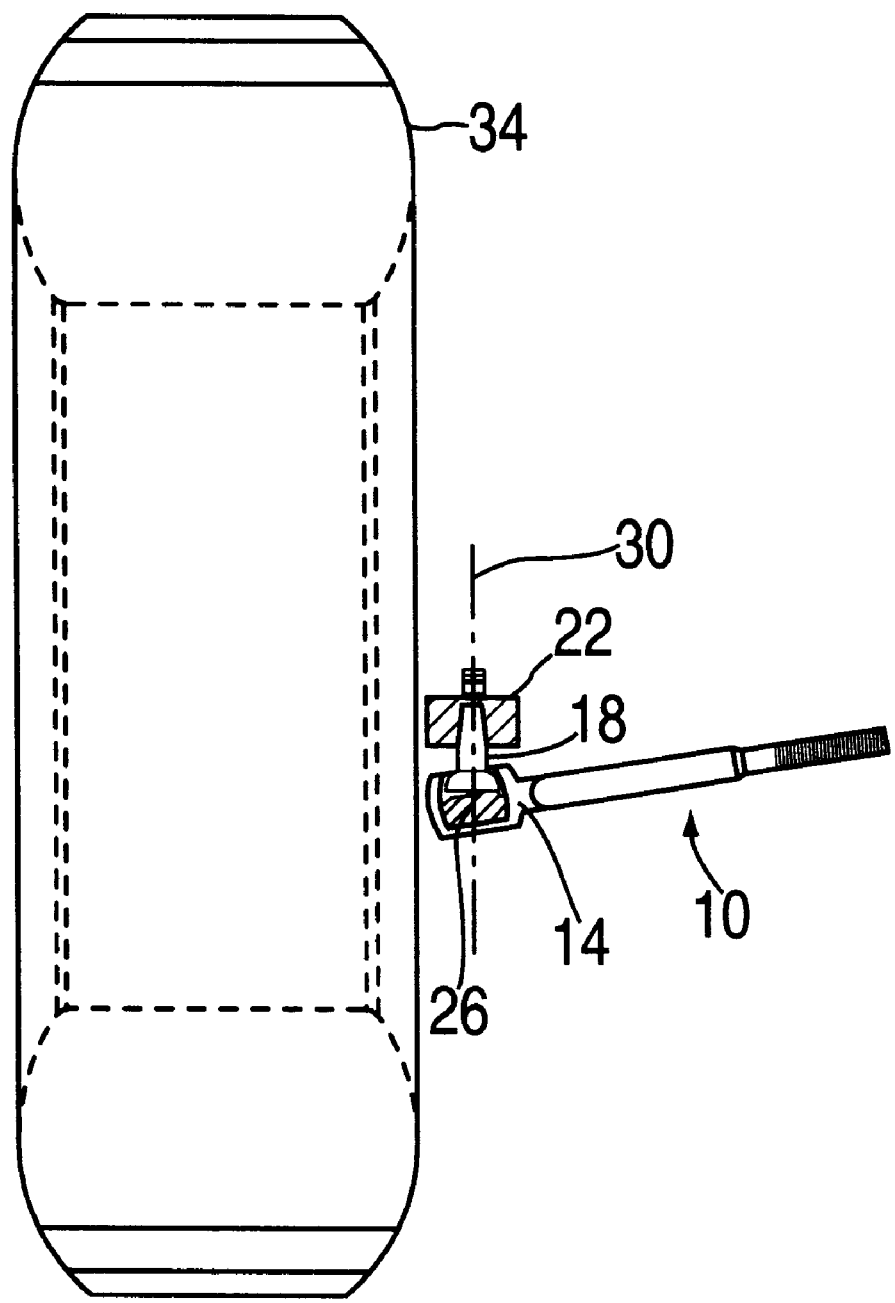
FIG. 1 shows a partial cross sectional view of a conventional outer tie rod member of a motor vehicle.

Referring initially to FIG. 1, an illustration of an outer tie rod member 10 that is presently available is shown. Outer tie rod member 10 has a socket 14 and ball stud 18. The ball stud 18 is connected to steering knuckle arm 22. Socket 14 contains pivot point 26 which is located directly in line with the center line 30 of stud 18. Steering knuckle arm 22 depends from a steering knuckle (not shown) that is operatively connected to wheel 34.

Figure 2:
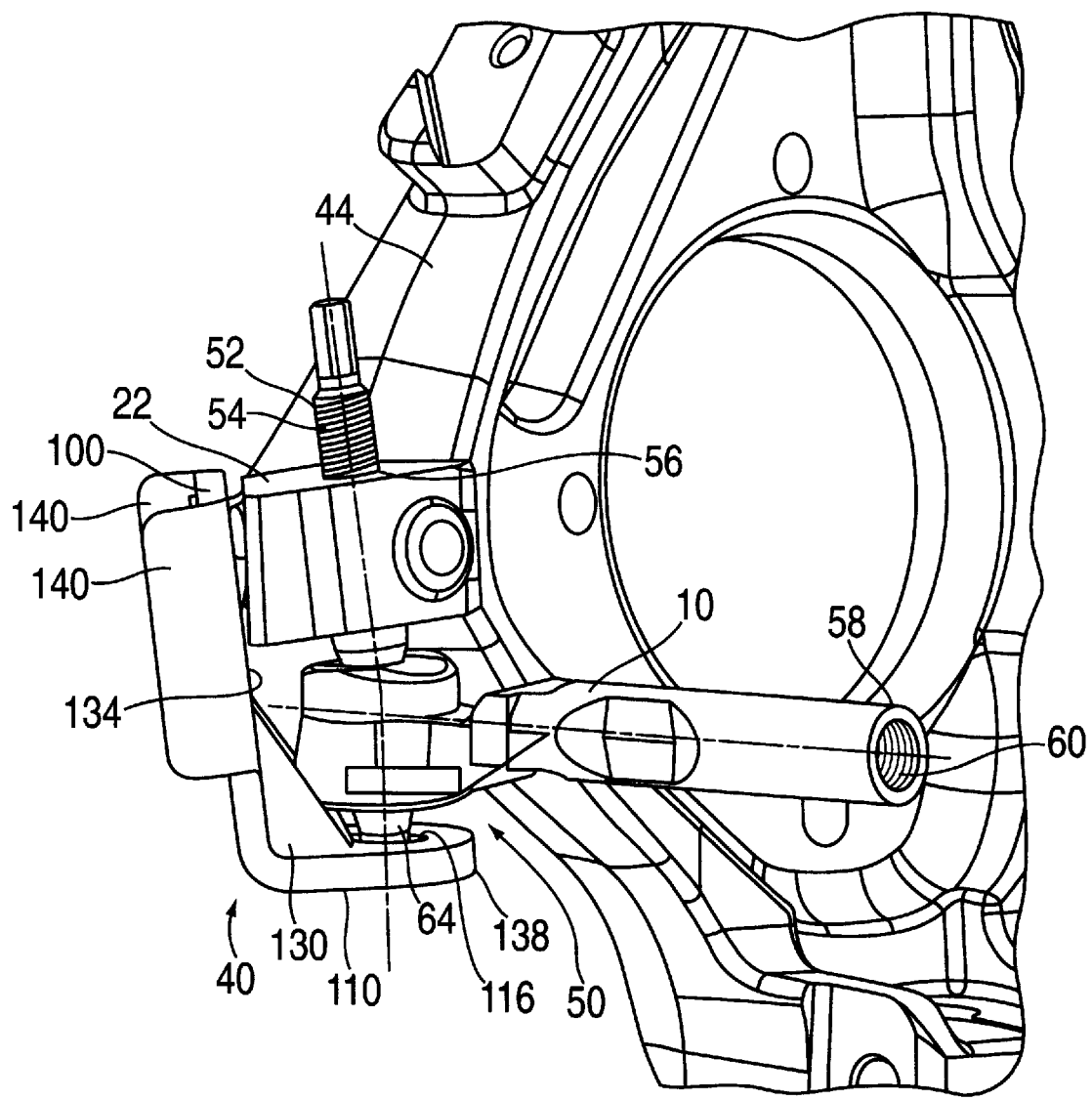
FIG. 2 is a perspective view of a preferred embodiment showing a tie rod assembly and steering knuckle.

Referring now to FIG. 2, an outer tie rod assembly connector body constructed in accordance with the teachings of a preferred embodiment is illustrated and generally identified with reference numeral 40. The outer tie rod assembly connector body 40 is shown operatively attached to a steering knuckle 44 via steering knuckle arm 22. It will be understood that the particular steering knuckle 44 illustrated is merely exemplary.

Figure 3:
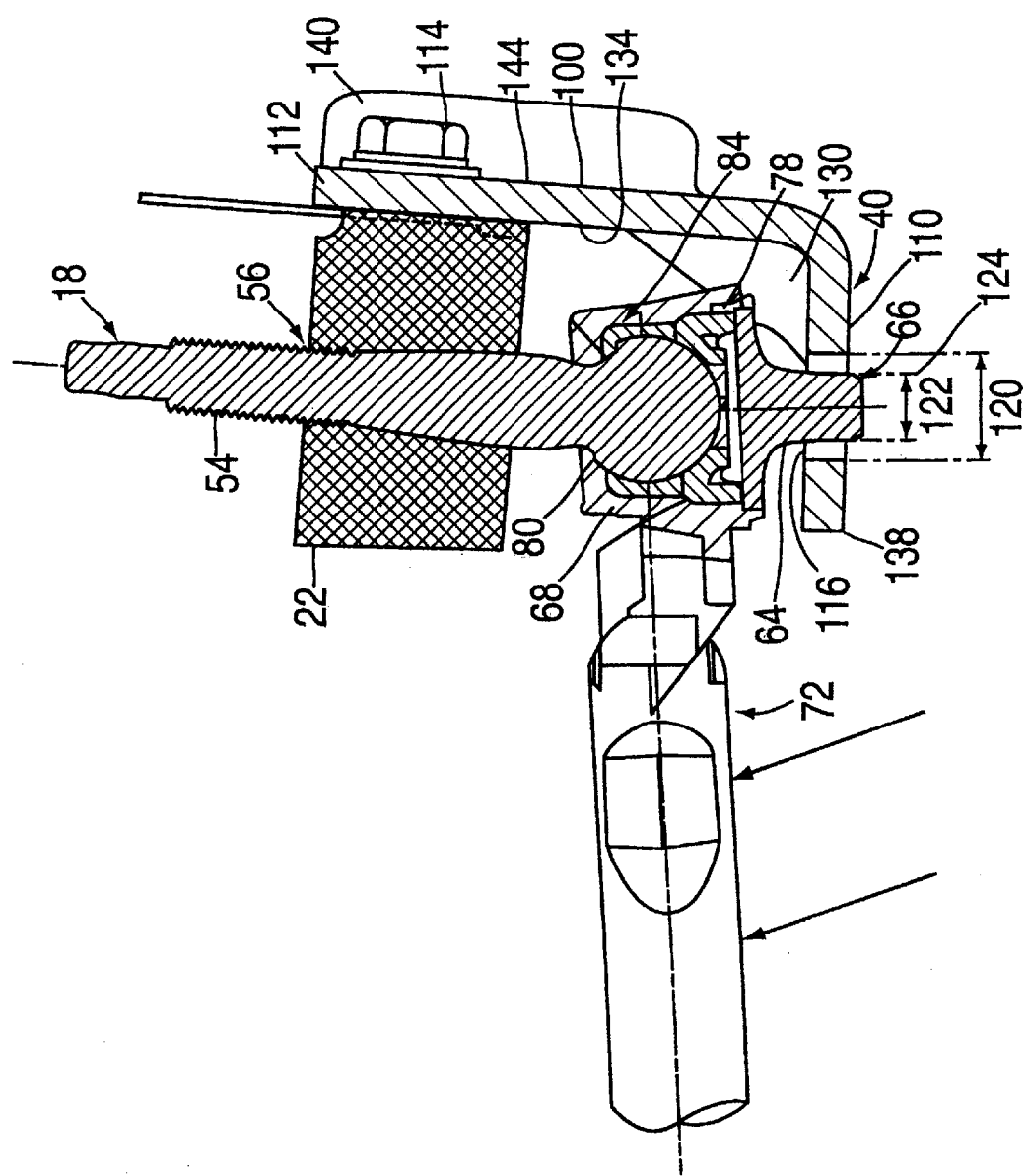
FIG. 3 is a cross sectional view of a preferred embodiment of an outer tie rod assembly connector body shown in FIG. 2.

With continued reference to FIG. 1 and additional reference to FIGS. 2 and 3, a tie rod assembly 50 generally includes an inner tie rod member (not shown), an outer tie rod member 10 and optionally includes an intermediate member (not shown). The outer tie rod member 10 is conventionally adapted to attach to the steering knuckle 44. In this regard, the outer tie rod member 10 includes a first end 52 having a threaded rod portion 54 which is integrally connected to a frustoconically shaped ball stud 18 and extends generally perpendicular to a longitudinal axis of the tie rod assembly 50, through an aperture 56 provided in the steering knuckle arm 22 and is retained with a nut (not shown) conventionally attached to the steering knuckle 44. A second end 58 of the outer tie rod member 10 is telescopically received optionally by the intermediate member (not shown), which in turn is telescopically received by the inner tie rod member (not shown). If an intermediate member is not utilized, an inner tie rod member telescopically receives outer tie rod member 10. In the embodiment illustrated, the second end of the outer tie rod member 10 is cylindrical and formed to include internal threads 60 to engage the members aforementioned.

The tie rod assembly 50 of a preferred embodiment is further shown to include a socket plug 64 having a protrusion 66 utilized for releasable containment by the outer tie rod assembly connector body 40 in the event of a ball stud 18 failure. Turning now to FIG. 3, a socket plug 64 forms one end of a socket housing 68 that surrounds ball 80 disposed at an opposite end of the threaded rod portion 54 of ball stud 18. Socket plug 64 is configured having a socket housing 68 that further includes a bore defining an access opening through which the ball stud 18 may be inserted into the socket housing 68 and a ball seat 84 for substantially receiving an upper hemisphere of the ball 80 of ball stud 18. The socket plug 64 is also utilized for closing the bore of the socket housing 68. Socket housing 68 is disposed at outer tie rod housing 72. Ball stud 18 emerges through an opening in socket housing 68 formed at the opposite end of socket plug 64. Socket housing 68 further comprises a spring seat 78 disposed proximate the socket plug 64 upon which a lower hemisphere of ball 80 of ball stud 18 rests. Ball 80 is further retained within socket housing 68 with a ball seat 84 that depends from an inside surface of the socket housing 68. The spring seat 78 applies a spring force against the socket plug 64 and the lower hemisphere of the ball 80 to eliminate lash in the ball and socket joint by further biasing upper hemisphere of ball 80 against ball seat 84.

An exemplary embodiment of an outer tie rod assembly connector body 40 is shown in FIGS. 2 and 3. Connector body 40 is configured having a first end 100 and a second end 110. First end 100 comprises a first plate and further includes at least one hole 112 (shown with phantom lines in FIG. 3) for fastening connector body 40 to the steering knuckle arm 22. In an exemplary embodiment, first end 100 is fastened to steering knuckle arm 22 using two bolts 114 (e.g., two M10×1.5 bolts). Second end 110 of connector body 40 is positioned, dimensioned and configured having an aperture 116 that concentrically aligns with and surrounds protrusion 66 of socket plug 64 as illustrated. In an exemplary embodiment, aperture 116 comprises a diameter 120 that is larger than a cross-sectional diameter 122 of protrusion 66. In this regard, if ball stud 18 were no longer connected to steering knuckle arm 22, protrusion 66 would be concentrically surrounded and contained within aperture 116 of second end 110 providing a steerable linkage. The protrusion 66 disposed within aperture 116 essentially maintains a connection between steering knuckle 44 and the tie rod assembly 50, yet allowing proper clearance between protrusion 66 and aperture 116 to allow for tie rod angulation requirements without interference under normal operating conditions. The difference in diameter of the aperture 116 and the diameter 122 of protrusion 66 provides an annulus 124 within which protrusion 66 is free to move exhibiting lash in the system. Such lash tends to provide notice to a vehicle operator that the steering system is operating on the connector body as opposed to the ball stud 18. The annulus 124 (clearance) that is between a surface defining aperture 116 and an outside surface forming a circumference of protrusion 66 determines the amount of lash in the system that is translated to the vehicle operator providing notice. The lash will persuade the vehicle operator to service the vehicle rather than continue driving the vehicle for the remainder of the vehicle life with only a connection via connector body 40.

At least one gusset 130 is utilized to reinforce, strengthen, and maintain an angle created between first end 100 and second end 110 that positions aperture 116 coaxially and concentrically around protrusion 64. In an exemplary embodiment, two gussets 130 are positioned on either side of aperture 116 and are formed when manufacturing the connector body 40 of one piece by stamping. To further maintain the angle created between first end 100 and second end 110, especially in an area 134 of first end 100 that may be susceptible to bending because of a moment arm created at aperture 116 of second end 110. First end further includes flanges 140 perpendicularly oriented to a planar surface 144 of first end 100 and disposed along a substantial length of first end 100, as shown, to prevent bending in area 134.

An exemplary embodiment of the connector body 40 herein disclosed comprises a High-Strength Low-Alloy (HSLA) steel variety stamped into a one-piece "L" bracket. A HSLA steel provides relatively high strength compared to its weight.

From the above it will be appreciated that the outer tie rod assembly connector body 40 provides an improved retention means to maintain a steerable linkage between an outer tie rod assembly 50 and steering knuckle 44.

While preferred embodiments have been shown and described, various modifications and substitutions may be made thereto without departing from the spirit and scope of the disclosure. Accordingly, it is to be understood that the present invention has been described by way of illustration only, and such illustrations and embodiments as have been disclosed herein are not to be construed as limiting to the claims.

What is claimed is:

1. A steering linkage arrangement for a motor vehicle includes an outer tie rod assembly connected to a steering knuckle with a ball stud and further includes an outer tie rod assembly connector body, the outer tie rod assembly connector body comprising:

a first end defined by a first surface of said connector body having at least one hole for mounting to the steering knuckle; and a second end defined by a second surface depending from said first surface of said connector body having an aperture for containing a socket plug protrusion of the outer tie rod assembly, wherein said first surface provides a sole operative connection surface between the connector body and the steering linkage arrangement via connection with the steering knuckle.

2. The connector body of claim 1 wherein at least one gusset depends from said first end and said second end for maintaining an angle between said first end and said second end.

3. The connector body of claim 1 wherein said first end further comprises a first plate, said first plate includes flanges disposed to resist bending of said first plate.

4. The connector body of claim 3 wherein said flanges are substantially perpendicular to said first plate.

5. The connector body of claim 1 wherein said aperture is positioned, dimensioned and configured to concentrically surround said socket plug protrusion with an annulus therebetween.

6. The connector body of claim 5 wherein said annulus is positioned, dimensioned and configured to provide lash noticeable to a vehicle operator in the event a steering linkage arrangement is operating through said connector body.

7. A steering linkage arrangement for a motor vehicle comprising:

an outer tie rod member having a socket;

a ball stud extending through one end of said socket and connected to a steering knuckle;

a socket plug at an opposite end of said socket for closing said socket and containing said ball stud; and a connector body having a first end defined by a first surface of said connector body having at least one hole for mounting to the steering knuckle, and a second end defined by a second surface depending from said first surface of said connector body having an aperture for containing a socket plug protrusion of the outer tie rod assembly, wherein said first surface provides a sole operative connection surface between the connector body and the steering linkage arrangement via connection with the steering knuckle.

8. The steering linkage arrangement of claim 7 wherein said socket plug comprises said socket plug protrusion for containment within said aperture.

9. The steering linkage arrangement of claim 8 wherein at least one gusset depends from said first end and said second end for maintaining an angle between said first end and said second end.

10. The steering linkage arrangement of claim 8 wherein said first end further comprises a first plate, said first plate includes flanges disposed to resist bending of said first plate.

11. The steering linkage arrangement of claim 10 wherein said flanges are substantially perpendicular to said first plate.

12. The steering linkage arrangement of claim 8 wherein said aperture is positioned, dimensioned and configured to concentrically surround said socket plug protrusion with an annulus therebetween.

13. The steering linkage arrangement of claim 12 wherein said annulus is positioned, dimensioned and configured to provide lash noticeable to a vehicle operator in the event a steering linkage arrangement is operating through said connector body.

14. A method of securing a steering knuckle to an outer tie rod assembly having a socket plug protrusion extending therefrom comprising;

aligning outer tie rod connector body having a first end defined by a first surface having at least one hole for mounting to the steering knuckle and having a second end defined by a second surface depending from said first surface with an aperture to receive and contain the socket plug protusion, said first surface provides a sole operative connection surface between the connector body and a steering linkage arrangement via connection with the steering knuckle;

fixedly attaching said first end to the steering knuckle wherein said second end is configured, dimensioned and positioned allowing said aperture to receive the socket plug and circumferentially surround the socket plug with a annulus therebetween providing enough play and containment to give a vehicle operator notice of a ball stud failure.

* * * * *